United States Patent

[11] 3,544,047

| [72] | Inventor | Edward A. Gabriel |
| | | Chester, Pennsylvania |
| [21] | Appl. No. | 707,708 |
| [22] | Filed | Feb. 23, 1968 |
| [45] | Patented | Dec. 1, 1970 |
| [73] | Assignee | The Boeing Company |
| | | Seattle, Washington |
| | | a corporation of Delaware |

[54] DOWNLOAD REDUCTION APPARATUS
10 Claims, 5 Drawing Figs.

[52] U.S. Cl. .................................................. 244/17.11, 244/130
[51] Int. Cl. ...................................................... B64c 27/00
[50] Field of Search ........................................... 244/17.19, 17.11, 130, 23, 12, 137

[56] References Cited

UNITED STATES PATENTS

| 2,918,233 | 12/1959 | Lippisch ........................ | 244/23 |
| 3,053,488 | 9/1962 | Cox, Jr. ........................ | 244/130 |
| 3,101,920 | 8/1963 | Fradenburgh ................. | 244/130 |

FOREIGN PATENTS

| 750,975 | 6/1944 | Germany ....................... | 244/17.11 |

Primary Examiner—Trygve M. Blix
Assistant Examiner—Paul E. Sauberer
Attorneys—Robert J. McDonnell, Matthew P. Lynch and Albert W. Hilburger ABSTRACT: Apparatus for reducing download on a vertical takeoff and landing aircraft. A fairing adapted to be suspended from the aircraft is selectively movable between an inoperative retracted position and an operative, extended position. In the extended position, the fairing is effective to decrease the size of a reduced pressure region created beneath the aircraft by a lift rotor and thereby to increase the lift capability of the aircraft.

Patented Dec. 1, 1970

3,544,047

INVENTOR:
EDWARD A. GABRIEL,
BY *Albert S. Hilberg*
ATTORNEY

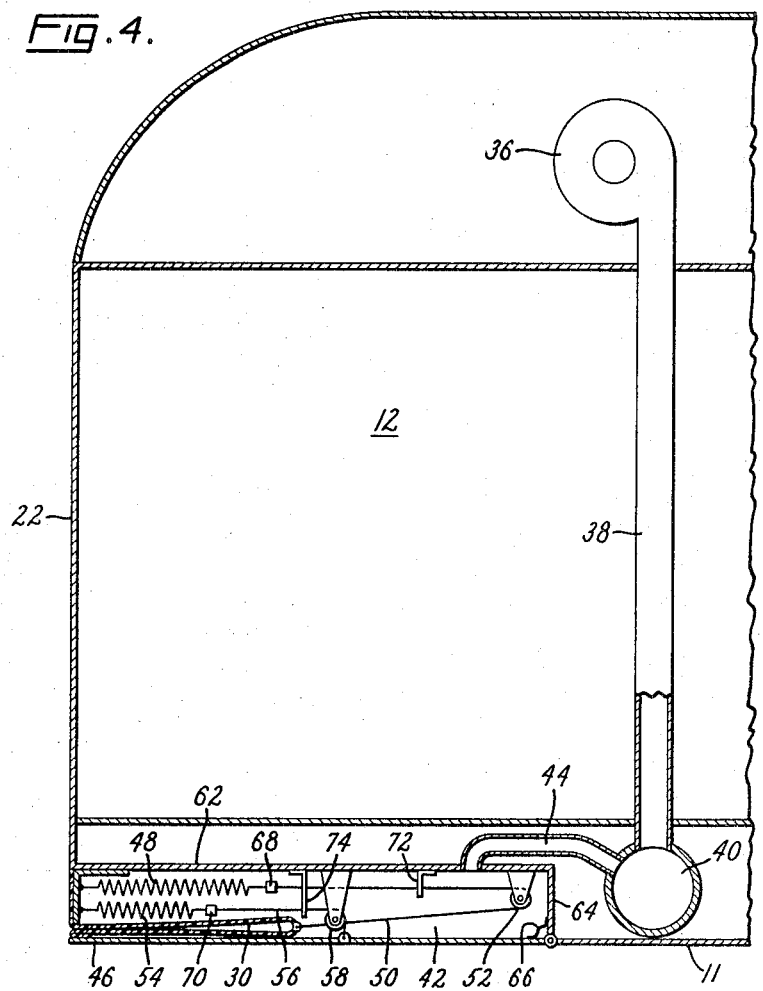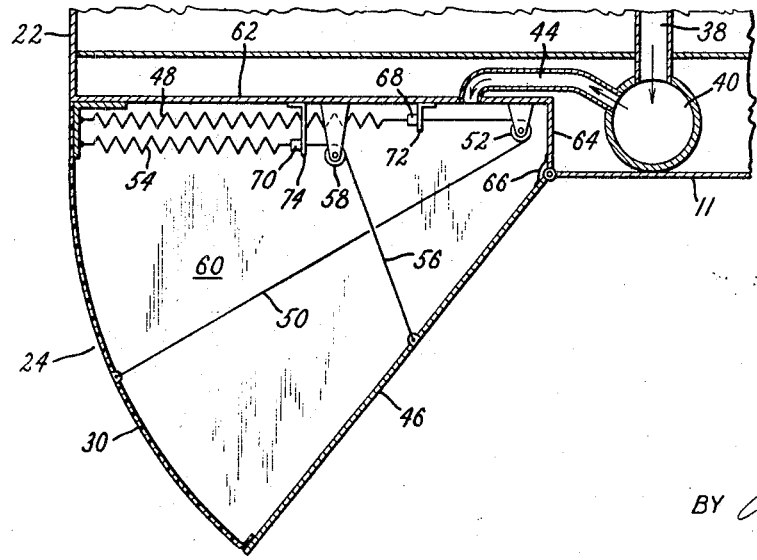

DOWNLOAD REDUCTION APPARATUS

This invention relates generally to aircraft and specifically to improvements in aircraft adapted to take off and land in a substantially vertical manner.

The rotor of a hovering aircraft of the vertical lift variety, such as a helicopter, produces a downwardly directed slipstream or downwash. For those portions of the aircraft which lie in this slipstream, a region of increased pressure results above those surfaces facing in the direction of the rotor and a region of reduced pressure results beneath those surfaces facing away from the rotor. Such a reduced pressure region is created adjacent the underside of the aircraft fuselage and has a width defined by locations on either side of the aircraft at which the downwash no longer adheres to, but separates from, the fuselage. This reduced pressure region beneath the fuselage of the aircraft causes a vertical drag or download on the aircraft which requires that the thrust of the rotor be sufficient not only to lift the aircraft but also to overcome the download.

Heretofore, a common expedient for reducing the effects of download resided in improving the aerodynamic configuration of the aircraft. This was accomplished by providing smooth outer surfaces so contoured that the downwash continued to adhere to the surfaces of the aircraft for a period which assured a minimum of download without causing a disproportionate amount of surface drag.

However, in certain applications of helicopters and other vertical takeoff and landing aircraft, it is not possible or practical to take advantage of the improved characteristics of aerodynamically contoured surfaces. One such instance resides in the concept of a flying crane in which a helicopter can be flown alone or in combination with a releasable cargo-carrying pod at its underside. For numerous reasons, it is preferred that the interface between the helicopter and its pod be substantially a flat surface. Since the pod itself can be aerodynamically contoured for minimum download, performance of the helicopter is unimpaired when carrying the pod. However, when the helicopter is flown in the absence of the pod, as when it is carrying cargo having dimensions or weight exceeding the capacity of the pod, its performance is substantially reduced by reason of the increased download caused by the flat underside of the aircraft.

The present invention provides apparatus for reducing download of such an aircraft and to this end provides a fairing adapted to be suspended from an aircraft and which may be selectively movable between an inoperative, retracted position and an operative, extended position. In the extended position, the fairing is effective to decrease the size of the reduced pressure region created beneath the aircraft by the lift rotor, thereby reducing download and increasing the lift capability of the aircraft.

Therefore, a primary object of the invention is to provide apparatus for improving the lift capability of a vertical takeoff and landing aircraft.

Another object of the invention is to provide an aircraft having an impeller for inducing lift by virtue of a downwardly directed slipstream, and a control mechanism on the aircraft for reducing the effective size of a resultant low-pressure region beneath the aircraft. A related object is the provision of such an aircraft in which the control mechanism includes a fairing adapted to be suspended from the aircraft.

Still another object of the invention is the provision of a helicopter having a fairing movable between a retracted position substantially flush with the outer surface of the fuselage and an extended position depending from the fuselage. A related object is the provision of such a helicopter in which the fairing in the extended position and a sidewall of the fuselage define a substantially smooth, continuous surface. Another related object is the provision of such a helicopter which includes an actuating mechanism for moving the fairing from a retracted position to the extended position.

A further object of the invention is the provision of a helicopter having an extensible control mechanism operable to decrease the magnitude of a reduced pressure region beneath the helicopter, the control mechanism being urged toward a retracted position, and including an actuating mechanism for moving the control mechanism from a retracted position to an extended position.

Other and further objects and advantages of the invention are obvious or are presented in the description which follows, taken together with the accompanying drawings in which like numerals refer to like parts throughout.

In the drawings:

FIG. 4 is a cross-sectional view taken generally along lines 4—4 in FIG. 1 and showing certain parts in a retracted position; and FIG. 5 is a cross-sectional view similar to FIG. 4 but showing certain parts in an extended position.

Figure 1:
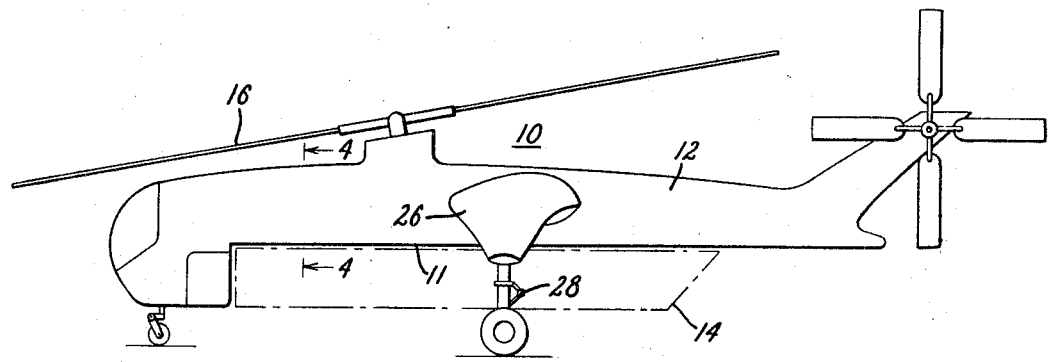
FIG. 1 illustrates an aircraft of the vertical takeoff and landing variety embodying principles of the present invention.

Refer now to the drawings and initially to FIG. 1 which illustrates a vertical lift aircraft in the form of a helicopter 10 modified according to the invention. The helicopter 10 represents a flying crane which is capable of receiving, at an underside 11 of its fuselage 12, a pod 14 (indicated by phantom lines) adapted to carry cargo or the like.

A rotor 16 is suitably mounted for rotation on the helicopter 10 and suitably driven so as to provide lift for the helicopter 10 upon its rotation. However, in the course of its operation, the rotor 16 produces a downwardly directed slipstream or downwash, particularly during hover, which creates a region of increased pressure above the fuselage 12 and a region 18 of reduced pressure beneath the fuselage. This phenomenon is seen especially well in FIG. 2, in which streamlines 20 indicating downwash from the rotor 16 adhere closely to sidewalls 22 of the fuselage 12, but subsequently separate abruptly from the fuselage adjacent the underside 11. The resultant region 18 of reduced pressure in turn causes a vertical drag or download which retards ascent of the helicopter 10. Thus, the power available to the rotor 16 must be sufficient not only to overcome the weight of the helicopter 10, but also to overcome the effect of the download. Although the effect of download has been substantially reduced in conventional helicopters by providing a smooth transition from sidewalls to the underside of the aircraft, so that the streamlines 20 adhere to the fuselage for a longer period and thereby reduce the width of the region 18, this solution has not been found a practical one for the flying crane, in which the interface between the pod 14 and the underside 11 of the helicopter is preferably a flat surface.

Having the configuration of a flying crane, the fuselage 12 of the helicopter 10 is substantially flat at its underside 11 and has substantially angular corners along the intersections of the sidewalls 22 with the underside 11. To reduce the download resulting from such a configuration, it has been found beneficial to provide the helicopter 10 with extensible units 24 at the underside 11 adjacent the sidewalls 22. The units 24 stretch the length of the underside 11, except possibly in those regions where structure of the helicopter 10 such as a streamlined beam 26 for a landing gear assembly 28 would obstruct the downwash from the rotor 16. Each extensible unit 24 includes a fairing 30 which serves as an extension for the sidewall 22 of the fuselage 12 when the unit 24 is in the extended position.

Figure 2:
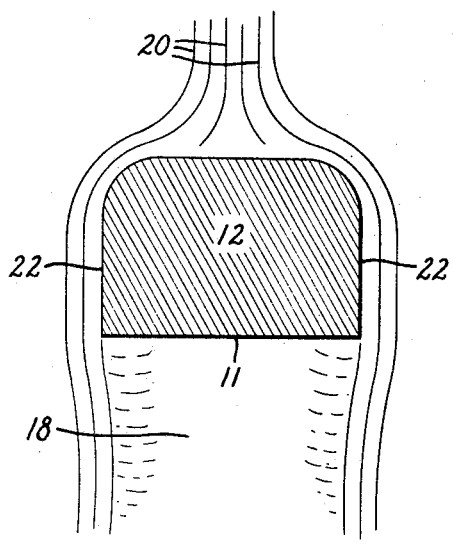
FIG. 2 is a schematic section view taken through the fuselage of the aircraft in FIG. 1 and illustrating flow of the slipstream from the rotor over the fuselage of the aircraft when certain parts are in a retracted position.
Figure 3:
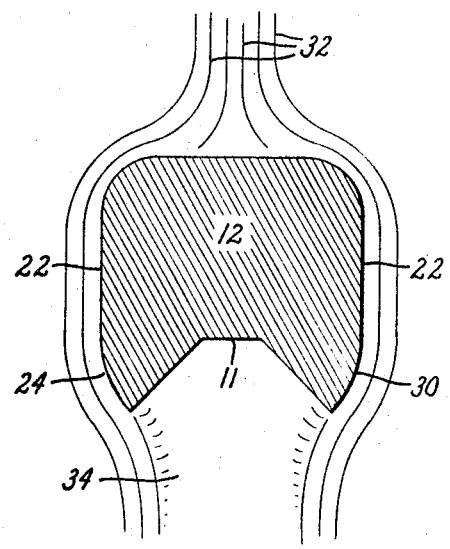
FIG. 3 is a section view similar to FIG. 2 but illustrating flow of the slipstream when the parts are in an extended position.

In FIG. 3 wherein the unit 24 is shown in the extended position, it is seen that streamlines 32, modified from the streamlines 20 illustrated in FIG. 2, extend beyond the sidewall 22 and adhere to the fairing 30. In this manner, the streamlines 32 are guided inwardly in the direction of the centerline of the fuselage 12, thereby resulting in a region 34 of reduced pressure which is substantially smaller in magnitude than the region 18 shown in FIG. 2. With a region of reduced magnitude, the vertical drag or download acting on the fuselage 12 is reduced, thereby permitting an increased payload or improved performance at the same payload as conventional aircraft otherwise having similar physical characteristics.

For the operation of each extensible unit 24, refer to FIG. 4 which illustrates a suitable pump 36 employed to direct pressurized fluid such as air through a conduit 38 and into a manifold 40 extending lengthwise of the fuselage 12. Storage cavities 42 are provided in the underside 11 adjacent each sidewall 22 and serve to contain the extensible units 24 when in a retracted position (FIG. 4). The extensible units are inflatable and to provide the necessary pressurized fluid for effecting their movement to the extended position (FIG. 5), fluid lines 44 connect the manifold 40 to the cavities 42 at a number of spaced locations along the length of the fuselage 12.

Each extensible unit 24 includes a door 46 extending lengthwise of the fuselage 12 and hinged to the underside 11 at locations spaced inwardly from the sidewall 22. When the door 46 is in a closed position (FIG. 4), it is substantially flush with the underside 11 and extends in a direction toward and terminates substantially at the sidewall 22. The fairing 30 is of a flexible, sheetlike material, examples including polyethylene film or fabric impregnated with a suitable material impermeable to the passage of fluid. As seen especially in FIGS. 4 and 5, the fairing 30 is bonded along an upper edge to the sidewall 22 of the fuselage 12 and at a lower edge opposite the upper edge is suitably bonded to an outer extremity of the door 46. Constantly urging the fairing 30 toward a retracted position (FIG. 4) is a mechanism which includes a spring 48 suitably fixed at one end adjacent the sidewall 22 and to a cable 50 at its other end. The cable 50 passes around a pulley 52 and at its far end is suitably fastened to the fairing 30 generally intermediate the upper and lower edges of the fairing 30. A similar mechanism is provided to urge the door 46 toward a closed position and includes a spring 54 suitably fixed at one end adjacent the sidewall 22 and at the other end to a cable 56 which passes around a pulley 58 and is suitably fastened at its extreme end to the door 46. Insuring fluid integrity of the extensible units 24, their opposite ends are provided with an elastic covering 60, such as a stretch fabric, bonded or otherwise fixedly secured along its respective edges to a floor 62 and a side 64 of the storage cavity 42, to the fairing 30, and to the door 46. Further, it is preferable that, like the fairing 30, the covering 60 be impregnated with a suitable material impermeable to the passage of fluid. It would also be advantageous to provide a fluid tight seal 66 extending along and covering the joints between the door 46 and the underside 11.

When it is desired to increase the performance of the helicopter 10 in the low-speed range or to increase the payload when carrying outsized loads too large to fit into a pod 14, pressurized fluid is directed into the storage cavity 42 by means of the air pump 36 to move the extensible units 24 to the extended position FIGS. 3 and 5). An extreme extended position for the extensible unit 24 is defined by stop members 68 and 70 fixed respectively to the cables 50 and 56. When the stop members 68 and 70 respectively strike brackets 72 and 74 fixed to the floor 62, and suitably apertured to permit passage of the cables but not the stop members, the fairing 30 and the door 46 have reached their extreme positions. When the helicopter 10 has reached a speed at which the advantage of reduced download is offset by the disadvantage of increased frontal drag of the extensible units 24, the pressurized fluid is suitably bled from the storage cavities 42 such that the spring 48 is effective to return the fairing 30 to a retracted position within the cavity 42 and the spring 54 is effective to return the door 46 to a closed position flush with the underside 11 of the fuselage 12. The extensible units 24 would also assume this retracted position whenever the pod 14 is attached to the helicopter 10.

While a certain specific embodiment of the invention has been described and illustrated, it will be clear that variations of the details of construction which are specifically illustrated and described may be resorted to without departing from the true spirit and scope of the invention.

I claim:
1. A vertical takeoff and landing aircraft comprising:
 a vehicle body including a sidewall, an underside, and a storage cavity in said underside adjacent said sidewall;
 impeller means adapted to provide lift for said body by producing a downwardly directed slipstream resulting in a region having a reduced pressure beneath said body; and
 control means including a fairing selectively movable between a retracted position within said cavity and an extended position suspended from said sidewall for reducing the effective size of said region.
2. An aircraft as set forth in claim 1 wherein said fairing in said extended position and said sidewall define a substantially smooth, continuous surface.
3. An aircraft as set forth in claim 2 including means urging said fairing toward said retracted position, and actuating means for moving said fairing from said retracted position to said extended position.
4. An aircraft as set forth in claim 3 wherein said extensible unit is inflatable and said actuating means includes a source of pressurized fluid and a conduit for directing said fluid into said unit for moving said fairing from said retracted position to said extended position.
5. A vertical takeoff and landing aircraft comprising: a vehicle body including a sidewall, an underside, and a storage cavity in said underside adjacent said sidewall; impeller means adapted to provide lift for said body by producing a downwardly directed slipstream resulting in a region having a reduced pressure beneath said body; and an extensible unit including a fairing of flexible sheet material fixed to said sidewall along one edge of said material, a door pivotally mounted on said underside at a location inboard of said sidewall and extending generally outwardly toward said sidewall, said door being movable between a closed position substantially covering said cavity and an open position permitting access to said cavity, said material fixed to said door along another edge of said material opposite said one edge and movable with said door from a retracted position within said cavity to an extended position depending from said sidewall, wherein said urging means includes a first resilient element biasing said material toward a retracted position within said cavity, and a second resilient element biasing said door toward said closed position, and actuating means for moving said material from said retracted position toward said extended position and for moving said door from said closed position toward said open position.
6. An aircraft as set forth in claim 5 wherein said material in said extended position and said sidewall define a substantially smooth, continuous surface.
7. An aircraft as set forth in claim 5 wherein said extensible unit includes an elastic covering fixed to said underside and to respective ends of said door and said fairing and movable with said fairing from said retracted position to said extended position and with said door from said closed position to said open position.
8. An aircraft as set forth in claim 7 wherein said material is an impregnated fabric and said covering is an impregnated stretch fabric.
9. An aircraft as set forth in claim 7 wherein said extensible unit is inflatable and said actuating means includes a source of pressurized fluid and a conduit for directing said fluid into said extensible unit.
10. An aircraft as set forth in claim 5 wherein said body includes a fuselage and said impeller means includes a rotor blade rotatably mounted on said fuselage and adapted, upon rotation, to provide lift to said fuselage.